United States Patent [19]
Ishikawa et al.

[11] Patent Number: 5,293,288
[45] Date of Patent: Mar. 8, 1994

[54] DUAL THIN-FILM MAGNETIC HEAD WITH SIDE SURFACE TERMINALS

[75] Inventors: Wataru Ishikawa; Takashi Watanabe, both of Miyagi, Japan

[73] Assignee: Sony Corporation, Tokyo, Japan

[21] Appl. No.: 34,597

[22] Filed: Mar. 22, 1993

Related U.S. Application Data

[63] Continuation of Ser. No. 700,870, May 16, 1991, abandoned.

[30] Foreign Application Priority Data

May 17, 1990 [JP] Japan .................................. 2-127588

[51] Int. Cl.⁵ .............................................. G11B 5/60
[52] U.S. Cl. ................................................... 360/103
[58] Field of Search .................... 360/103, 104; 29/603

[56] References Cited

U.S. PATENT DOCUMENTS 5,068,759 11/1991 Matsuzaki ......................... 360/103

FOREIGN PATENT DOCUMENTS 0009417  1/1977  Japan .................................. 360/103
0148622  7/1986  Japan .................................. 360/103
0246015 12/1988  Japan .................................. 360/103

*Primary Examiner*—Robert S. Tupper
*Attorney, Agent, or Firm*—Hill, Steadman & Simpson

[57] ABSTRACT

A thin-film magnetic head comprises a floating slider provided with two pairs of recesses, a pair of thin-film magnetic head elements formed between the two pairs of recesses on the end surface of the floating slider, and terminals formed by filling up the recesses of the floating slider with a conductive material. Each terminal has a front surface exposed in the end surface of the floating slider, and a side surface exposed in the side surface of the floating slider adjacent to the end surface of the same. Lead wires are connected respectively to the side surfaces of the terminals exposed respectively in the side surfaces of the floating slider. The thin-film magnetic head is one of a plurality of thin-film magnetic heads obtained by dicing a substrate on which a plurality of pairs of thin-film magnetic head elements are formed into a plurality of floating sliders each carrying a pair of thin-film magnetic head elements. When the substrate is diced, the side surfaces of the terminals are exposed in the side surfaces of each floating slider.

6 Claims, 4 Drawing Sheets

FIG. 2A1
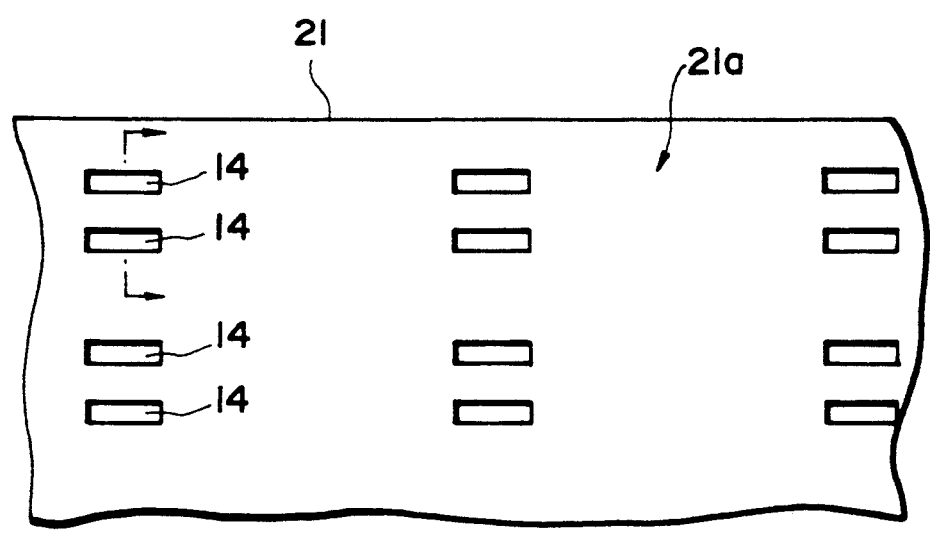
FIG. 2A2
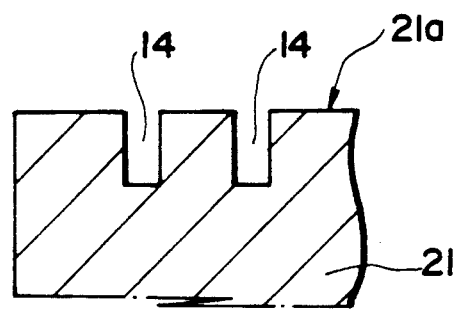

FIG. 2B₁
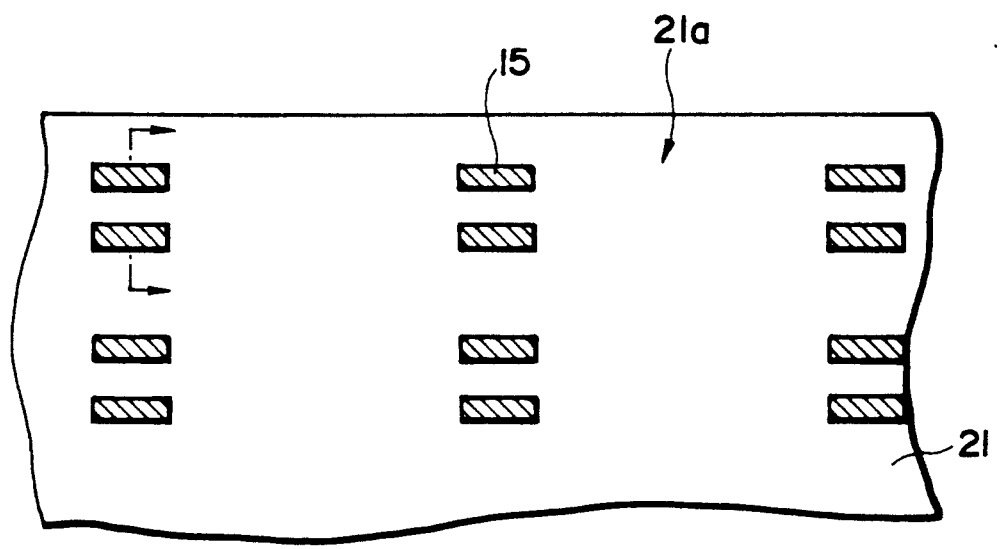
FIG. 2B₂
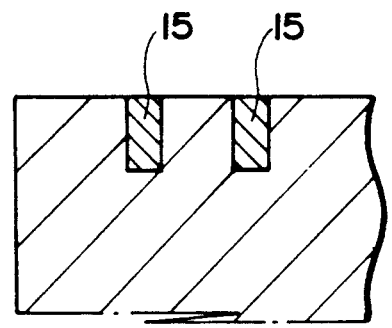

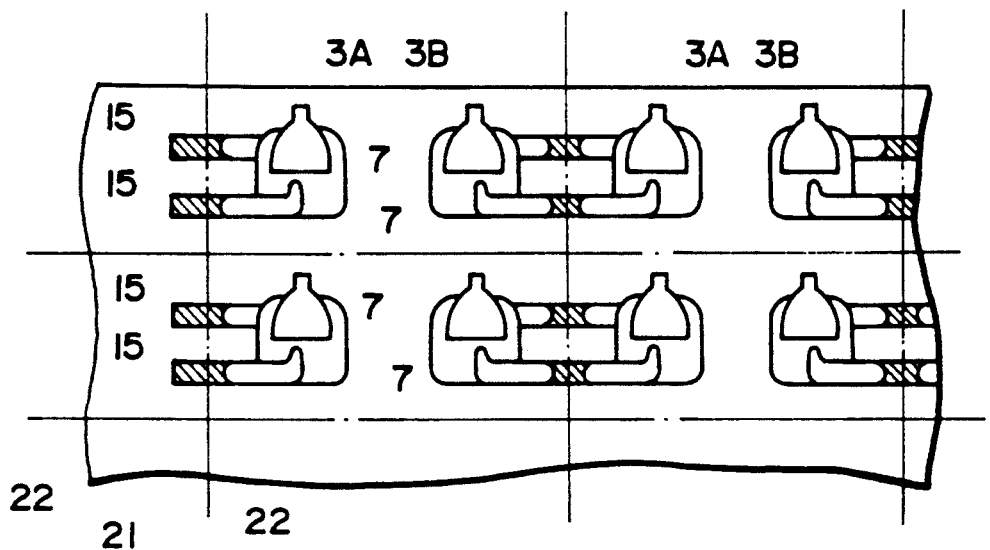
FIG. 2C1
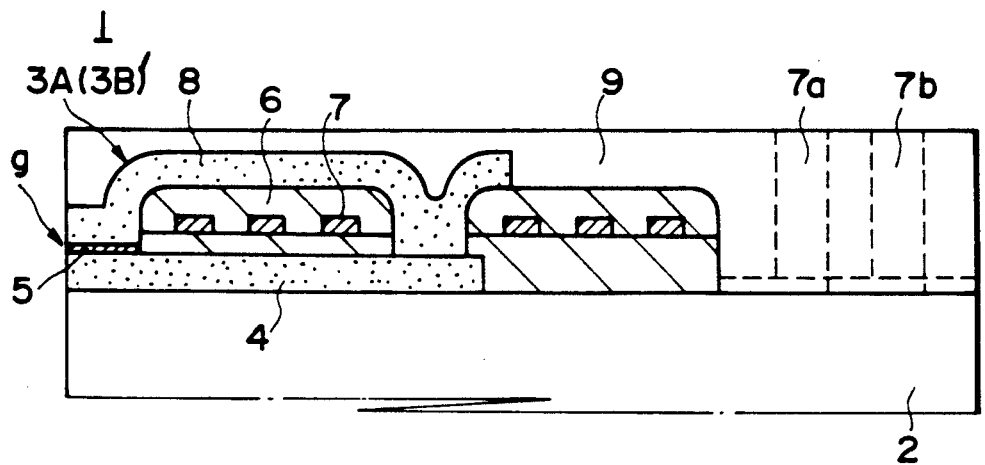
FIG. 3 PRIOR ART
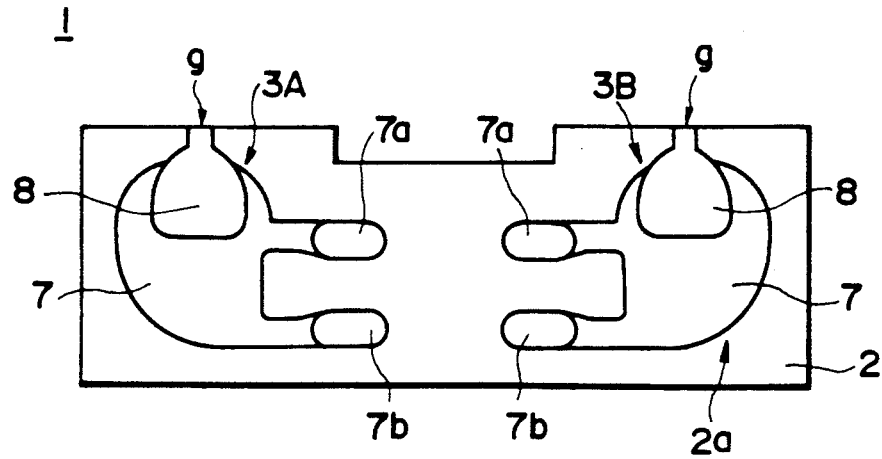
FIG. 4 PRIOR ART

DUAL THIN-FILM MAGNETIC HEAD WITH SIDE SURFACE TERMINALS

This is a continuation of application Ser. No. 700,870, filed May 16, 1991, now abandoned.

BACKGROUND OF THE INVENTION

1. Field of the Invention

The present invention relates to a thin-film magnetic head to be incorporated into a magnetic disk unit.

2. Description of the Prior Art

Shown in FIGS. 3 and 4 is a conventional thin-film magnetic head 1 of a two-element type for recording and reproducing operation in combination with a hard disk. The thin-film magnetic head 1 comprises a floating slider 2, and two thin-film magnetic head elements 3A and 3B, which are denoted inclusively by a reference numeral "3", formed on the end surface of the floating slider 2. A lower magnetic film 4, a nonmagnetic film 5 for forming a magnetic gap g, an insulating film 6 and a conductive film 3, ordinarily, a copper film, for forming a coil are formed sequentially in that order on the end surface 2a of the floating slider 2, an opening is formed so as to face the rear connecting portion of the lower magnetic film 4, an upper magnetic film 8 is formed so as to be connected to the lower magnetic film 4 through the opening and so as to form the magnetic gap g between the lower magnetic film 4 and the upper magnetic film 8 with the magnetic film 5 therebetween, terminals 7a and 7b to be connected to lead wires are formed in the conductive film 7, and then a protective film 9 is formed to complete the thin-film magnetic head elements 3A and 3B.

Generally, the terminals 7a and 7b of the conductive film 7, and the thin-film magnetic head elements 3A and 3B are formed on the same end surface 2a of the floating slider 2 as proposed in, for example, Japanese Patent Laid-open (Kokai) No. 57-105819.

The terminals 7a and 7b of the thin-film magnetic head 1 occupy a large area in the end surface 2a of the floating slider 2. To reduce the effect of external vibrations on the thin-film magnetic head 1 by reducing the size and weight of the thin-film magnetic head 1, efforts have been made to reduce the size of the floating slider 2 through the curtailment of the area occupied by the terminals 7a and 7b. A current millislider is 3.2 mm in width, 4.0 to 4.7 mm in length and 0.86 to 1.27 mm in height. A microslider of 2.1 to 2.3 mm in width, 2.5 to 2.9 mm in length and 0.50 to 0.86 mm in height, and a nanoslider of 1.6 mm in width, 2.0 mm in length and 0.4 to 0.5 mm in height have been developed. Further efforts are being made to develop a picoslider smaller than such a nanoslider. However, the reduction of the size and weight of the thin-film magnetic head has been limited by the limit of reduction of the terminals 7a and 7b.

The terminals 7a and 7b are formed by selective plating, and then the protective film 9 is formed by sputtering a protective material, such as $Al_2O_3$. During the sputtering process for forming the protective film 9, $Al_2O_3$ is deposited also over the terminals 7a and 7b, and hence portions of the protective film covering the terminals 7a and 7b must be removed by a film removing means, such as lapping. Accordingly, portions of the conductive film, i.e., the copper film, forming the terminals 7a and 7b must be formed in a thickness greater than the distance between the surface of the insulating film 6 on which the conductive film 7 is formed and the upper surface of the upper magnetic film 8, which requires much time and labor which cannot be disregarded and requires complicated manufacturing processes.

SUMMARY OF THE INVENTION

Accordingly, it is an object of the present invention to provide a thin-film magnetic head of a compact, lightweight construction capable of being manufactured by a simple manufacturing processes.

The present invention provides a thin-film magnetic head constructed by forming recesses (14) in the major surface of a substrate (21), forming a plurality of pairs of thin-film magnetic head elements (3A, 3B) on the major surface of the substrate (21), filling up the recesses (14) with a conductive material (15) to form terminals (16a, 16b), dicing the substrate (21) into individual floating sliders (13) each carrying a pair of thin-film magnetic head elements (3A, 3B) and having two pairs of terminals (16a, 16b), and connecting lead wires (18) respectively to the side surfaces of the terminals (16a, 16b) perpendicular to both the end surface (13A) of the floating slider (13) on which the thin-film magnetic head elements (3A, 3B) are formed and a floating surface (13C) to connect the lead wires (18) electrically to the conductive films (7) of the thin-film magnetic head elements.

Since the terminals (16a, 16b) are formed of the conductive material (15) filling up the recesses (14), and the lead wires (18) are connected to the side surfaces of the terminals (16a, 16b) perpendicular to both the front surface (13A) and floating surface (13C) of the slider (13), namely, the surfaces of the terminals (16a, 16b) exposed respectively in the side surfaces (13B) of the slider (13), the front surface (13A) may be smaller than that of the conventional thin-film magnetic head to form the floating-slider (13) in a size smaller than that of the floating slider of the conventional thin-film magnetic head, so that the thin-film magnetic head (12) can be formed in a compact, lightweight construction.

Practically, terminals (16) for a plurality of thin-film magnetic heads can be formed automatically by forming a plurality of recesses (14) for the plurality of thin-film magnetic heads in a single substrate, filling up the recesses with the conductive material (15), and dividing the substrate into a plurality of floating sliders without requiring any additional process for forming the terminals (16).

BRIEF DESCRIPTION OF THE DRAWINGS

The above and other objects, features and advantages of the present invention will become more apparent from the following description taken in connection with the accompanying drawings, in which:

FIGS. 2A$_1$, 2A$_2$, 2B$_1$, 2B$_2$ and 2C$_1$ are views of assistance in explaining processes of manufacturing the thin-film magnetic head of FIG. 1; and FIGS. 3 and 4 are a sectional view and a plan view, respectively, of a conventional thin-film magnetic head.

DETAILED DESCRIPTION OF THE PREFERRED EMBODIMENT

Figure 1:
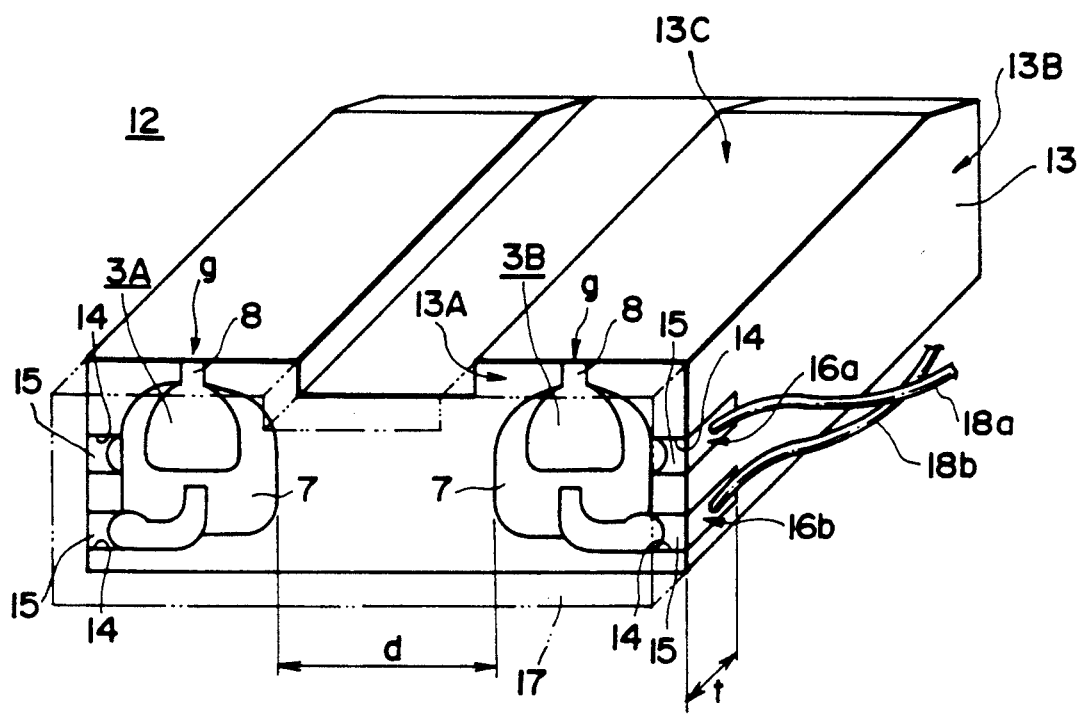
FIG. 1 is a perspective view of a thin-film magnetic head in a preferred embodiment according to the present invention.

Referring to FIG. 1, a thin-film magnetic head 12 embodying the present invention has a pair of thin-film magnetic head elements 3A and 3B, which are denoted inclusively by a reference character "3", formed on the end surface 13A of a floating slider 13 and each having a conductive film 7 serving as a coil and provided with terminals 16a and 16b, which are denoted inclusively by a reference numeral "16", formed by filling up recesses 14 formed in the end surface 13A of the floating slider 13 with a conductive material 15. One surface of each terminal 16 is included in a side surface 13B adjacent to the end surface 13A, namely, a surface perpendicular to both the end surface 13A and a floating surface 13C. The two thin-film magnetic head elements 3A and 3B are disposed at a predetermined interval d so that magnetic gaps g are included in the floating surface 13C. Each thin-film magnetic head element 3, similarly to the thin-film magnetic head element shown in FIG. 3, comprises a lower magnetic film 4, a nonmagnetic film 5 for forming the magnetic gap g, an insulating film 6, conductive film 7 forming a coil, and an upper magnetic film 8 formed in that order on the end surface 13A of the floating slider 13. The conductive film 7 is connected electrically to the surfaces of the terminals 16a and 16b included in the end surface 13A of the floating slider 13, respectively. The thin-film magnetic head elements 3 are coated with a protective film 17, such as an Al$_2$O$_3$ film. Lead wires 18a and 18b, which are denoted inclusively by a reference numeral "18", are connected respectively to the surfaces of the terminals 16a and 16b included in the side surface 13B adjacent to the end surface 13A.

Steps of forming the thin-film magnetic head 12 will be described hereinafter with reference to FIGS. 2A$_1$, 2A$_2$, 2B$_1$, 2B$_2$ and 2C$_1$.

When the floating slider 13 is a glass substrate 21 formed of a photosensitive glass which crystallizes when exposed to light, such as Photoceram ® (Corning Glass Works), the major surface 21a of the glass substrate 21 is covered with a mask of a predetermined pattern as shown in FIG. 2A$_1$, and is exposed to light to crystallize the glass substrate 21 excluding portions corresponding to the recesses 14. Then, the portions corresponding to the recesses 14 of the major surface 21a of the glass substrate 21 are etched by a wet etching process to form the recesses 14 of a depth greater than the thickness t of the terminals 16. Then, as shown in FIGS. 2B$_1$ and 2B$_2$, the recesses 14 are filled up with a conductive paste 15 by a screen printing process or the like, and then the conductive paste 15 filling up the recesses 14 are sintered to form the terminals 16. Then, the major surface 21a is lapped in a flat surface so that the thickness of the terminals 16 formed in the recesses 14 coincides with the thickness t. In this embodiment, the plurality of recesses 14 for a plurality of thin-film magnetic head elements of a plurality of thin-film magnetic heads are formed simultaneously. Then, as shown in FIG. 2C$_1$, pairs of thin-film magnetic head elements 3A and 3B are formed on the major surface 21a of the glass substrate 21 by a known process. The conductive film 7 is connected electrically to the front surfaces of the terminals 16a and 16b exposed in the major surface 21a of the substrate 21. Then, a protective film 17 is formed over the thin-film magnetic head elements 3A and 3B. Then, the substrate 21 is diced along alternate long and short dash lines 22 (FIG. 3C$_1$) to divide the substrate 21 into individual sliders 13. Thus, a plurality of thin-film magnetic heads 12 shown in FIG. 1 are obtained. Each thin-film magnetic head 12 has terminals 16a and 16b having surfaces exposed respectively in the side surfaces 13B of the slider 13.

When a substrate formed of calcium titanate is employed, the recesses 14 are formed by subjecting the major surface of the substrate covered with a mask to powder beam etching, i.e., etching by means of a jet of abrasive grains. The rest of the steps are the same as those applied to manufacturing the foregoing embodiment.

Since the terminals 16a and 16b are exposed in the side surfaces 13B of the floating slider 13, the interval d between the thin-film magnetic head elements 3A and 3B may be comparatively small and the area of the end surface 13A of the floating slider 13 may be comparatively small, so that the floating slider 13 can be formed in a comparatively small size and hence the thin-film magnetic head 12 can be formed in a further compact, further lightweight construction as compared with the conventional thin-film magnetic head. The lightweight thin-film magnetic head is less subject to external vibrations than the conventional thin-film magnetic head. Since the terminals 16a and 16b are formed by filling up the recesses 14 with the conductive material 15, the protective film 17 need not be formed in an excessive thickness, which reduces time necessary for forming the protective film 17. Since the side surfaces of the terminals 16a and 16b are exposed in the side surfaces 13B of the floating slider 13, namely, cut ends of the floating slider 13 formed when the substrate 21 is divided into individual floating sliders 13 by dicing, steps of the manufacturing process can be reduced and, consequently, the thin-film magnetic head 12 can be manufactured at a manufacturing cost lower than that of the conventional thin-film magnetic head. Furthermore, since the terminals 16a and 16b have surfaces exposed in the major surface of the substrate 21 on which the thin-film magnetic head elements 3A and 3B are formed, the thin-film magnetic head 12 can be formed in a small size as compared with the conventional thin-film magnetic head and hence the number of thin-film magnetic heads in accordance with the present invention formed on the substrate 21 is greater than that of conventional thin-film magnetic heads which can be formed on the same substrate, which further reduces the manufacturing cost.

Although the invention has been described in its preferred form with a certain degree of particularity, obviously many changes and variations are possible therein. It is therefore to be understood that the invention may be practiced otherwise than as specifically described herein without departing from the scope and spirit thereof.

What is claimed is:

1. A thin-film magnetic head comprising: a floating slider having a floating surface, an end surface at the trailing edge of said slider transverse to and adjacent said floating surface, and a pair of side surfaces transverse to and adjoining said floating and end surfaces, two pairs of deep recesses, said pairs of recesses each being provided on said side surfaces and said end surface; a pair of thin-film magnetic head elements formed between said two pairs of recesses; and terminals formed by completely filling up said recesses of the floating slider with a conductive material; characterized in that each terminal has a front surface exposed in said end surface of the floating slider and a side surface exposed in the side surface of said floating slider adjacent to said end surface, lead wires may be connected respectively to the side surfaces of the terminals exposed respectively in the side surfaces of the floating slider adjacent to the end surface of the same.

2. The thin-film magnetic head according to claim 1, including a protective film overlying said end surface.

3. The thin-film magnetic head according to claim 1, wherein said terminals each have a single surface which is flush with said side surface.

4. The thin-film magnetic head according to claim 1, wherein said front surfaces of said terminals are flush with said end surface.

5. The thin-film magnetic head according to claim 1, wherein said terminals are elongate in the direction normal to said end surface.

6. A thin-film magnetic head according to claim 1, wherein the terminals formed by filling up said recesses are located on two opposite side surfaces of said slider.

* * * * *